US009350084B1

(12) United States Patent
Harris et al.

(10) Patent No.: US 9,350,084 B1
(45) Date of Patent: May 24, 2016

(54) PROVIDING A NON-ZERO ORBITAL ANGULAR MOMENTUM FEED BEAM TO A REFLECTIVE ANTENNA

(71) Applicant: L-3 Communications Corp., New York, NY (US)

(72) Inventors: Johnny M. Harris, Layton, UT (US); Osama S. Haddadin, Salt Lake City, UT (US); Zachary C. Bagley, Salt Lake City, UT (US); Brandon G. Walsh, Syracuse, UT (US); Jonathan C. Landon, Salt Lake City, UT (US)

(73) Assignee: L-3 Communications Corp., New York, NY (US)

(*) Notice: Subject to any disclaimer, the term of this patent is extended or adjusted under 35 U.S.C. 154(b) by 288 days.

(21) Appl. No.: 14/077,493

(22) Filed: Nov. 12, 2013

(51) Int. Cl.
*H04L 5/04* (2006.01)
*H01Q 19/10* (2006.01)
*H01Q 19/06* (2006.01)
*H01Q 3/14* (2006.01)
*H01Q 3/20* (2006.01)

(52) U.S. Cl.
CPC ................. *H01Q 19/10* (2013.01); *H01Q 3/14* (2013.01); *H01Q 3/20* (2013.01); *H01Q 19/06* (2013.01)

(58) Field of Classification Search
CPC ........ H04B 7/0617; H04L 5/04; H04L 47/82; H04L 25/14; H04L 27/2697; H01Q 3/26; H04W 72/044; H04J 1/08; G01S 7/024; G01S 7/499; G01S 17/74; G01S 13/78; G01S 13/751
USPC .................... 370/343, 310, 252, 431; 342/54; 343/914, 915, 916, 786, 753, 754; 375/267
See application file for complete search history.

(56) References Cited

U.S. PATENT DOCUMENTS

| | | | | |
|---|---|---|---|---|
| 8,432,884 | B1 * | 4/2013 | Ashrafi | H04L 5/04 370/343 |
| 8,743,984 | B2 * | 6/2014 | Djordjevic | H04B 10/2581 375/260 |
| 9,031,151 | B1 * | 5/2015 | Harris | H04B 7/0617 375/267 |
| 9,240,956 | B2 * | 1/2016 | Chen | H04L 47/82 |
| 2010/0013696 | A1 * | 1/2010 | Schmitt | G01S 7/024 342/54 |
| 2011/0150464 | A1 | 6/2011 | Murshid et al. | |
| 2012/0319915 | A1 | 12/2012 | Roh et al. | |
| 2013/0027774 | A1 | 1/2013 | Bovino et al. | |
| 2013/0106664 | A1 | 5/2013 | Igwe | |
| 2013/0121330 | A1 | 5/2013 | Ashrafi | |
| 2013/0235744 | A1 | 9/2013 | Chen et al. | |
| 2015/0146815 | A1 * | 5/2015 | Berretta | H04L 27/18 375/279 |

OTHER PUBLICATIONS

U.S. Appl. No. 14/077,433, filed Nov. 12, 2013, L-3 Communications Corp.

(Continued)

*Primary Examiner* — Sue A Purvis
*Assistant Examiner* — Awat Salih
(74) *Attorney, Agent, or Firm* — Brian Tucker; Kirton McConkie

(57) ABSTRACT

Electromagnetic (EM) feeds can illuminate a standard primary reflective antenna with a plurality of feed beams each having a different orbital angular momentum (OAM) or polarization. The reflective antenna, which can be a non-OAM antenna, can reflect the feed beams and thereby produce a composite OAM transmission comprising each of the feed beams. A non-OAM primary antenna can thus transmit a plurality of OAM feed beams as a composite OAM transmission.

25 Claims, 9 Drawing Sheets

(56) References Cited

OTHER PUBLICATIONS

Edfors et al., "Is Orbital Angular Momentum (OAM) Based Radio Communications an Unexploited Area?," IEEE (2011), pp. 1-7.
Lundin, "Interference and Energy Conservation in Phased Antenna Arrays and Young's Double Slit Experiment," (Dec. 12, 2012), pp. 1-45.
Mohammadi et al., "Orbital Angular Momentum in Radio—A System Study," IEEE Transactions on Antennas and Propagation, (publication date unknown but prior to Sep. 30, 2013), pp. 1-7.
U.S. Appl. No. 14/272,213, filed May 7, 2014, L-3 Communications Corp.
Ashmawy et al., "Joint MCMA and DD blind equalization algorithm with variable-step size," IEEE (2009), pp. 174-177.
Hung et al., "A Hybrid Variable Step-Size Adaptive Blind Equalization Algorithm for QAM Signals," IEEE Globecom 2005, pp. 2140-2144.
Hung et al., "Variable-Step-Size Multimodulus Blind Decision-Feedback Equalization for High-Order QAM Based on Boundary MSE Estimation," ICASSP 2004 (IEEE 2004), pp. 881-884.
Wei et al., "A Variable Step Size Blind Equalization Algorithm for QAM Signals," ICMMT 2010 Proceedings (IEEE 2010), pp. 1801-1804.

* cited by examiner

PROVIDING A NON-ZERO ORBITAL ANGULAR MOMENTUM FEED BEAM TO A REFLECTIVE ANTENNA

BACKGROUND

As is known, electromagnetic (EM) radiation can have a non-zero orbital angular momentum (OAM), and EM beams (e.g., radio frequency beams) with a non-zero OAM can be transmitted and received. FIG. 1 illustrates an example of a prior art OAM antenna system 100 comprising a feed 102 and a reflective antenna 112. Typically, the feed 102 illuminates the reflective face 104 of the antenna 112 with a non-OAM EM signal 114 (e.g., a radio frequency signal 114 with zero OAM). From a starting edge 116 to an ending edge 118, the surface of the face 104 twists and moves along an axis 110 such that there is a discontinuity 106 (e.g., a step) between the starting edge 116 and the ending edge 118. The foregoing shape can impart a non-zero OAM to the EM signal 114 as the EM signal 114 reflects off of the face 104 of the antenna 112. The beam 108 reflected from the antenna 112 can thus have non-zero OAM. That is, as shown in FIG. 1, the beam 108 can twist around the axis 110 as the beam propagates away from the face 104.

As illustrated in FIG. 2, multiple OAM beams 202, 204 (two are shown but there can be more) each in the same frequency band but having a different mode can be combined and transmitted as a composite transmission 200 from an EM transmitter (not shown). An EM receiver (not shown) can received the composite transmission 200 and separate the multiple OAM beams. The ability to combine multiple beams in the same frequency band provides for the possibility of very high data rate transmissions. Two OAM beams (e.g., each like one of beams 108, 202, 204) with the same mode but opposite polarization can also be combined at a transmitter and separated at a receiver.

Some embodiments of the present invention efficiently combine multiple OAM beams to transmit a composite OAM beam comprising a plurality of OAM beams each with a different mode and/or polarization.

SUMMARY

In some embodiments of the invention, an antenna system can include an OAM mode zero reflective antenna, and a first feed positioned to illuminate the reflective antenna with a first OAM feed beam. The first OAM feed beam can have a mode m OAM, where m is not zero.

In some embodiments of the invention, an antenna system can include an OAM mode zero reflective antenna and first feed means for feeding a first OAM feed beam to the reflective antenna. The first OAM feed beam can have a mode m OAM, where m is not zero.

In some embodiments of the invention, a process can include illuminating an OAM mode zero reflective antenna with a first OAM feed beam. The first OAM feed beam can have a mode m OAM, where m is not zero. The process can also include reflecting from the reflective antenna the first OAM feed beam.

DETAILED DESCRIPTION OF EXEMPLARY EMBODIMENTS

Figure 1:
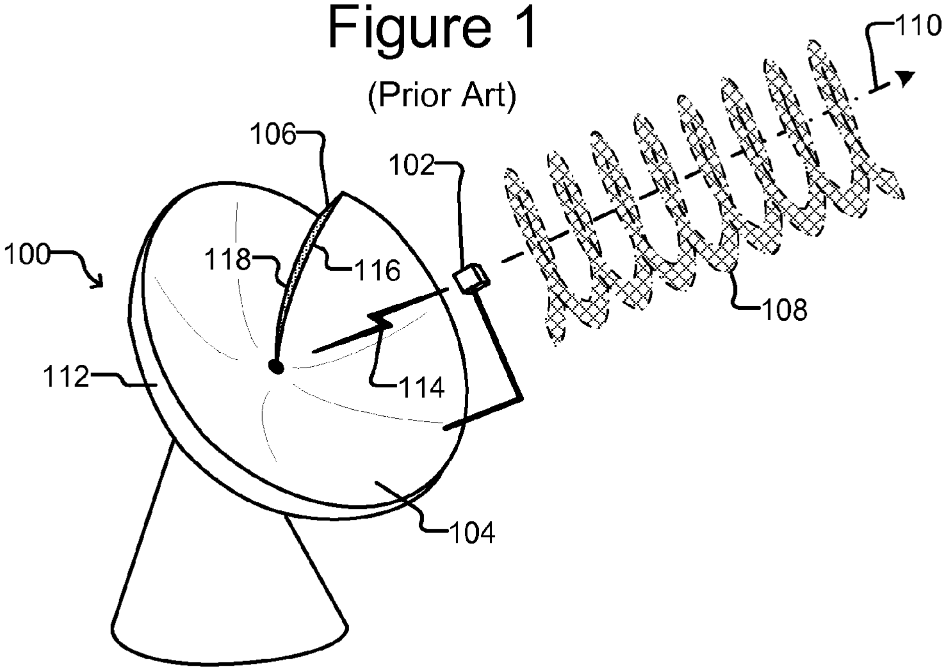
Figure 1 (Prior Art)
FIG. 1 illustrates an example of a prior art OAM antenna for imparting OAM to an incident EM signal.
Figure 2:
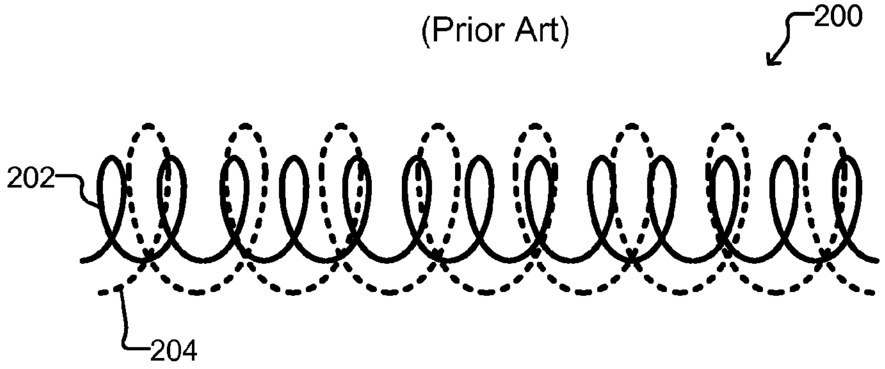
Figure 2 (Prior Art)
FIG. 2 illustrates that multiple OAM beams each with a different OAM mode or polarization can be combined into a composite OAM beam.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

A "spiral" is a three-dimensional curve that: winds around an axis at a continuously varying distance, or winds around an axis at a constant or continuously varying distance while moving parallel to the axis. A three-dimensional curve is substantially a spiral if the three-dimensional curve is within ten percent of the foregoing requirements. A "helix" is a three-dimensional curve that winds around an axis through the center of a cylinder or cone and lies on the cylinder or cone such that an angle of the curve to any plane perpendicular to the axis is constant. A three-dimensional curve is substantially a helix if the three-dimensional curve is within ten percent of the foregoing requirements. A helix can be an example of a spiral.

The acronym "OAM" means orbital angular momentum, and "EM" means electromagnetic. An "OAM shaped surface" is a geometric surface with curvature for imparting non-zero OAM to an EM signal. An "OAM antenna" is an antenna with an OAM shaped surface. An "OAM beam" refers to EM radiation with a non-zero OAM. A "non-OAM beam" is EM radiation with zero OAM. In other words, a non-OAM beam does not have OAM.

An "OAM mode" of an OAM beam is a signed integer, where the sign indicates whether the OAM beam twists to the right or to the left as the OAM beam twists around and propagates along an axis, and the integer value corresponds to a distance traveled by the OAM beam along the axis during one complete revolution around the axis. A beam with an OAM mode of zero has no OAM.

The term "central," as used with reference to a point, area, or region on a surface or of a structure, includes any point, area, or region that is inside of and does not include the outer perimeter of the surface or structure.

Figure 3:
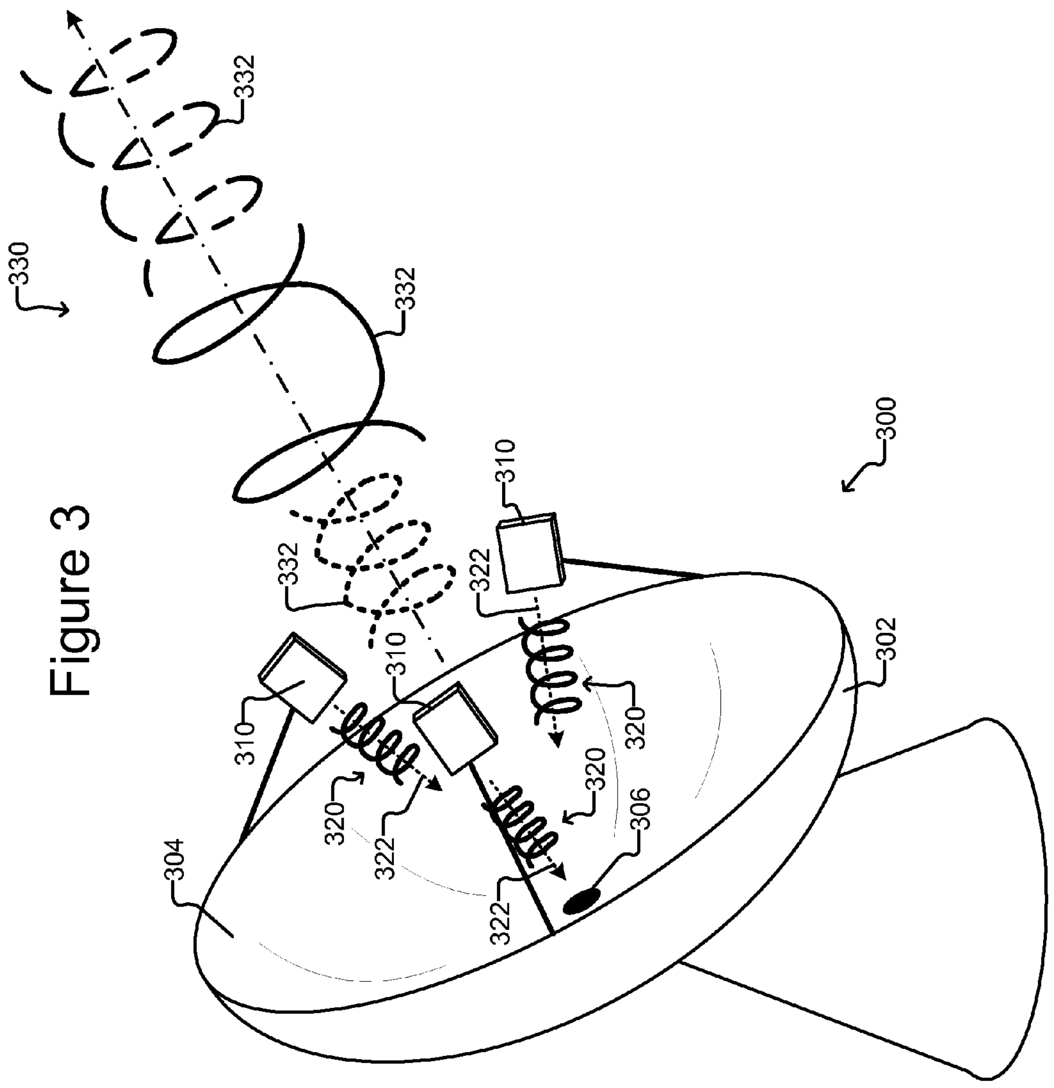
FIG. 3 illustrates an example of an antenna system for illuminating a non-OAM reflective antenna with OAM feed beams according to some embodiments of the invention.

In some embodiments, a non-OAM primary reflective antenna—that is, a reflective antenna that does not impart OAM to incident feed beams—can be illuminated with one or more OAM feed beams. The non-OAM reflective antenna reflects the OAM feed beams as reflected OAM beams. A non-OAM primary antenna can thus be configured to transmit OAM beams. FIG. 3 illustrates an example.

As shown in FIG. 3, an antenna system 300 can comprise a primary reflective antenna 302 and one or more OAM feeds 310 (three are shown but there can be one, two, or more than three). Each feed 310 can illuminate the reflective face 304 of the primary antenna 302 with an OAM feed beam 320. For example, each feed 310 can direct an OAM feed beam 320 at the focal point 306 of the face 304. Moreover, the feeds 310 can direct the OAM feed beams 320 substantially simultaneously onto the reflective face 304. The primary antenna 302 can reflect the OAM feed beams 320 as reflected individual OAM beams 332, which can combine to form a composite OAM transmission 330. Each of the OAM feed beams 320, and thus each of the reflected individual OAM beams 332, can have a different OAM mode and/or polarization, and a distant receiver (not shown) can thus receive the composite OAM transmission 330 and separate each of the individual OAM beams 332. The individual OAM beams 332 are illustrated separately in FIG. 3 for clarity and ease of illustration. The individual OAM beams 332, however, can be overlapping and combined into a single composite transmission 330.

A feed 310, including any configuration of a feed 310 disclosed herein, can be an example of feed means for feeding an OAM feed beam to a reflective antenna. Although illustrated as separate structures, two or more of the feeds 310 can be contained in the same housing (not shown).

The primary antenna 302 can comprise a reflective face 304 with a focal point 306. For example, the primary antenna 302 can be a dish type antenna such as a parabolic dish antenna. The primary antenna 302 can be a standard reflective antenna that does not impart OAM to incident beams. In other words, the primary antenna 302 can be an OAM mode zero antenna. Thus, for example, as shown in FIG. 3, the reflective face 304 of the primary antenna 302 lacks a discontinuity like the discontinuity 106 of the OAM antenna 112 of FIG. 1. The reflective face 304 of the primary antenna 302 can thus reflect each incident OAM feed beam 320 without substantially changing the OAM of the feed beam 320. Each of the reflected individual OAM beams 322 can thus have substantially the same OAM as the corresponding incident OAM feed beam 320.

Each OAM feed 310 can be positioned to illuminate the face 304 of the primary reflective antenna 302 with an OAM feed beam 320. For example, as noted, each OAM feed 310 can be oriented to point substantially at a focal point 306 of the face 304. The focal point 306 can be, for example, in a central region of the face 304 and/or at a substantially center point of the face 304. Each OAM feed 310 can provide an OAM feed beam 320 having non-zero OAM. For example, each OAM feed beam 320 can propagate along and twist around an axis 322 from the corresponding feed 310 to the focal point 306 of the face 304. Each feed 310 can be configured to provide an OAM feed beam 320 with a different OAM mode and/or polarization so that each of the OAM feed beams 320 has a different OAM mode or, if two of the OAM feed beams 320 have the same OAM mode, the two OAM beams 320 with the same OAM mode have opposite polarizations.

Figure 4:
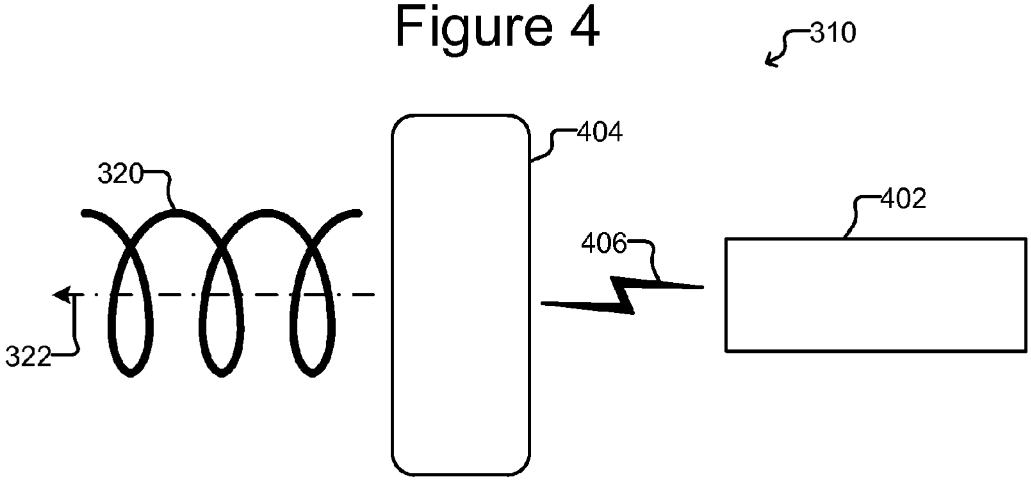
FIG. 4 shows a simplified block diagram depiction of components of a feed in the antenna system of FIG. 3 according to some embodiments of the invention.

FIG. 4 illustrates a simplified block diagram example of an OAM feed 310. As illustrated, each feed 310 can comprise a feed line 402 and an OAM device 404. The feed line 402 can provide an EM signal 406 to the OAM device 404. The EM signal 406 can have zero OAM and thus be an OAM mode zero signal. The OAM device 404, however, can impart non-zero OAM to the EM signal 406 and thus produce an OAM feed beam 320 (see FIG. 3) from the EM signal 406. As noted, the OAM feed beam 320 can have non-zero OAM corresponding to a particular OAM mode. In some embodiments, the OAM devices 404 of each of the OAM feeds 310 can impart a different OAM mode to an EM signal 406. An OAM device 404, including any configuration of the OAM device 404 disclosed herein, is an example of means for imparting a mode x OAM to a zero OAM EM signal to thereby produce an OAM feed beam. Although not shown, a feed 310 can also include a polarizing device for polarizing the EM signal 402.

Figure 5:
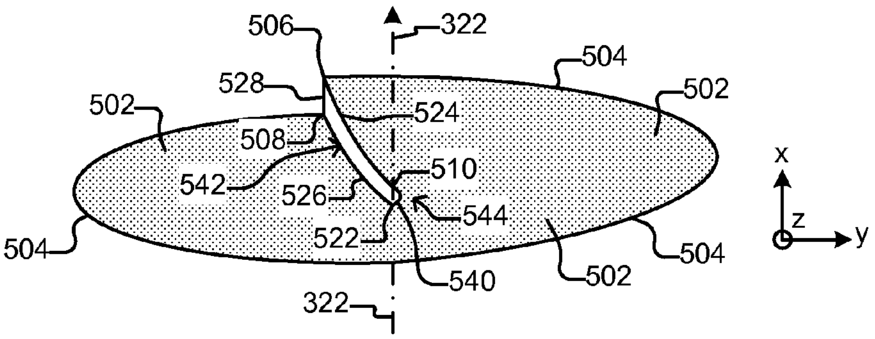
FIG. 5 illustrates an example of an OAM shaped surface according to some embodiments of the invention.

The OAM device 404 in each feed 310 can comprise an OAM shaped surface that interacts with the EM signal 406 to impart non-zero OAM to the EM signal 406 and thereby produce the OAM feed beam 320. FIG. 5 illustrates an example of such an OAM shaped surface 502. Non-limiting examples of possible characteristics of an OAM shaped surface are illustrated in FIG. 5 and discussed below.

The OAM shaped surface 302 in FIG. 5 can have any one or more of the following characteristics. The axis 322 about which a corresponding OAM feed beam 320 twists as it propagates from a feed 320 to the face 304 of the primary antenna 302 (see FIG. 3) can pass through a central region 544 of the surface 502. The central region 544 can be, for example, a point substantially at the center of the OAM shaped surface 502. The OAM shaped surface 502 can be bound by an outer perimeter 504, a first edge 524, and a second edge 526, and there can be a discontinuity 542 (e.g., a step) between the first edge 524 and the second edge 526. The OAM shaped surface 502 can extend from the outer perimeter 504 to the central region 544. The surface 502 can be curved or comprise a curve from points (e.g., every point or all of the points except the first point 506 and the second point 508) on the perimeter 504 to the central region 544, and any such curvature of the surface 502 from a point on the perimeter 504 to the central region 544 can be concave and/or substantially parabolic. The first edge 524 and/or the second edge 526 can also be curved concavely and/or can comprise a substantially parabolic curve.

Additional possible characteristics of the OAM shaped surface 502 include the following. The perimeter 504 can extend from a first point 506 around the axis 322 to a second point 508, and the first point 506 and the second point 508 can be separated by a non-zero distance (which can correspond to the mode of the corresponding OAM feed beam 320). The surface 502 can have an outer edge 528 between the first point 506 and the second point 508. The first point 506 and the second point 508 can be on a line that is substantially parallel to the axis 322. The first edge 524 can be a line (which can be straight or curved, continuous or discontinuous) from the first point 506 to a third point 510, and the second edge 526 can be a line (which can be straight or curved, continuous or discontinuous) from the second point 508 to a fourth point 522. The third point 510 and the fourth point 522 can be at or adjacent to the central region 544. For example, the third point 510 and the fourth point 522 can be on the axis 322 and separated by a non-zero distance. The surface 502 can have an inner edge 540 between the third point 510 and the fourth point 522.

Further possible characteristics of the surface 502 include the following. The first edge 524, the second edge 526, and the axis 322 can be substantially on the same plane. From the first point 506 to the second point 508, the outer perimeter 504 of the surface 502 can twist about the axis 322 while moving along the axis 322. The perimeter 504 can be substantially a spiral around the axis 322, and in some embodiments, the perimeter 504 can be substantially a helix around the axis 322. From the first point 506 to the second point 508, the perimeter 504 can make substantially one complete revolution around the axis 322. From the first edge 524 to the second edge 526, the surface 502 can turn (i.e., twist) about the axis 322. The surface 502 can turn about the axis 322 in a substantially spiral or substantially helix pattern. The surface 502 can make substantially one complete revolution around the axis 322.

The shape of the surface 502 shown in FIG. 5 is but an example. As will be seen, variations are possible and contemplated. Examples of such variations include the OAM shaped surface 602 shown in FIGS. 6A-6C and the OAM shaped surface 802 in FIGS. 8A-9B.

Figure 6A:
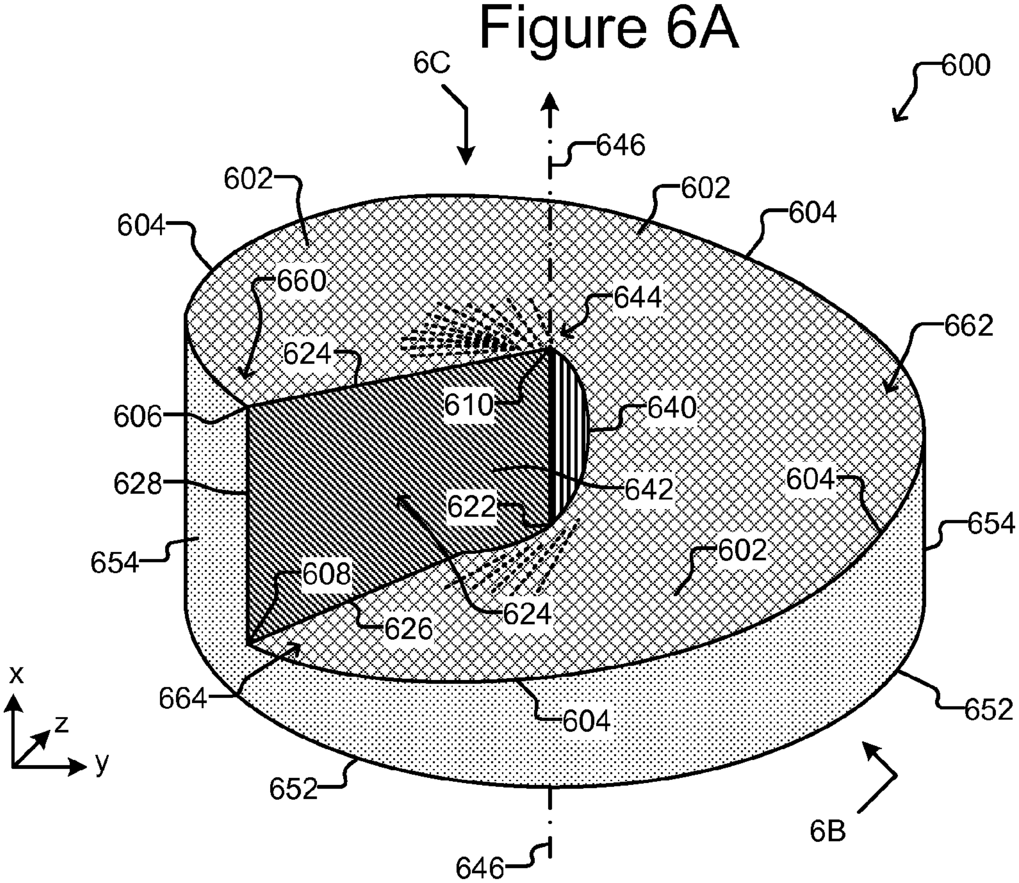
FIG. 6A is a perspective view of an example of an OAM lens that can be utilized in a feed in the antenna system of FIG. 3 according to some embodiments of the invention.
Figure 6B:
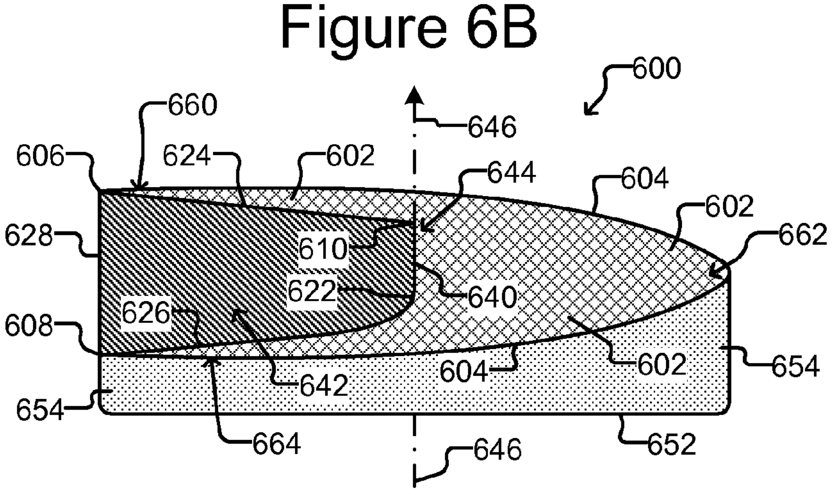
FIG. 6B is a side view of the OAM lens of FIG. 6A.
Figure 6C:
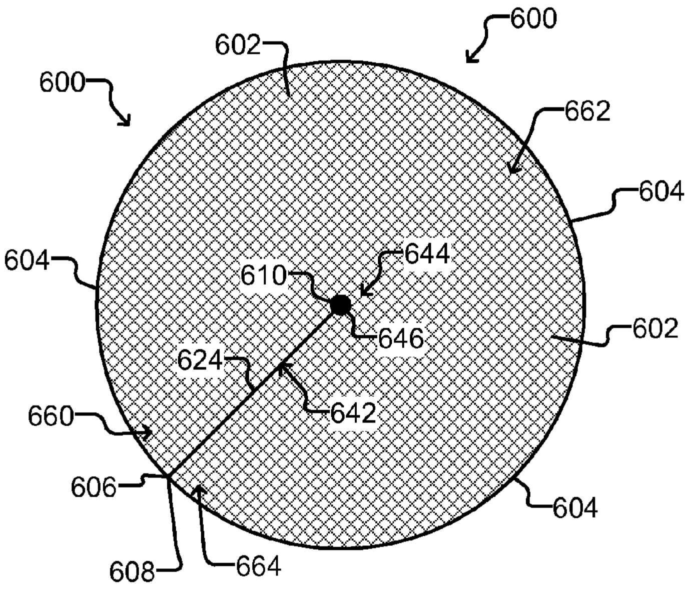
FIG. 6C is a top view of the OAM lens of FIG. 6A.

FIGS. 6A-6C illustrate an example of the OAM device 404 of FIG. 4 in the form of an OAM lens 600. That is, the OAM device 404 of FIG. 4 can be the lens 600.

The lens 600 can comprise material that is substantially transparent to EM radiation and thus to an EM signal 406. The lens 600 can comprise an OAM shaped surface 602 on one side and a substantially planar (i.e., substantially flat) surface 652 on an opposite side. The planar surface 652 can be substantially perpendicular to an axis 646 that passes through a central region 644 of the OAM surface 602. For example, the axis 646 can pass through a point on the OAM surface 602 that is substantially at the center of the OAM surface 602, and/or the axis 646 can pass through a point on the planar surface 652 that is substantially at the center of the planar surface 652. Sidewalls 654 between the OAM shapes surface 602 and the planar surface 652 can be substantially perpendicular to the planar surface 652.

As mentioned, the OAM shaped surface 602 is an example of an OAM surface, which can have one or more of the characteristics discussed above of the OAM surface 502 shown in FIG. 5 and can interact with a zero OAM EM signal 406 to impart non-zero OAM to the EM signal 406 and thereby produce an OAM feed beam 320 the twists about the axis 646, which is thus equivalent to the axis 322 in FIG. 3.

As shown, the OAM shaped surface 602 can be bound by an outer perimeter 604, which can extend from a first point 606 around the axis 646 to a second point 608. The outer perimeter 604 can twist around the axis 646 as the perimeter 604 moves along the axis 646. The outer perimeter 604 can be substantially a spiral or substantially a helix from the first point 606 around the axis 646 to the second point 608. The first point 606 and the second point 608 can be a non-zero distance apart and can be on a line that is substantially parallel with the axis 646. The distance between the first point 606 and the second point 608 can define the OAM mode of the lens 600. The outer perimeter 604 can make substantially one revolution around the axis 646 from the first point 606 to the second point 608.

As also shown in FIGS. 6A-6C, the OAM shaped surface 602 can extend from a first edge 624 around the axis 646 to a second edge 626. Moreover, the first edge 624, the second edge 626, an outer edge 628, and an inner edge 640 can define a discontinuity 642 (e.g., a step). The first edge 624 can be from the first point 606 to a third point 610, which can be on or adjacent to the axis 646, and the second edge 626 can extend from the second point 608 to a fourth point 622. The outer edge 628 can be from the first point 606 to the second point 608, and the inner edge 640 can be from the third point 610 to the fourth point 622.

The characteristics of the OAM shaped surface 602 discussed above are examples. The surface 602 can have one or more of the foregoing characteristics as well as other characteristics. The surface 602 need not have all of the characteristics discussed above.

As can be seen in FIGS. 6A-6C, the thickest portion 660 of the lens 600 from the planar surface 652 to the OAM shaped surface 602 is at or adjacent to the first point 606, and the thinnest portion 664 of the lens 600 from the planar surface 652 to the OAM shaped surface 602 is at or adjacent to the second point 608. Moreover, the thickness of the lens 600 from the planar surface 652 to the OAM shaped surface 602 decreases along the perimeter 604 from the thickest portion 660 to the thinnest portion 664. Thus, for example, a portion 662 of the lens 600 between the thickest portion 660 and the thinnest portion 664 can have an intermediate thickness.

As the corresponding EM signal 406 (see FIG. 4) passes through the lens 600, for example, from the planar surface 652 to the OAM shaped surface 602, the portion of the EM signal 406 that passes through the thickest portion 660 takes longer to pass through the lens 600 than the portion of the EM signal 406 that passes through the intermediate portion 662, which takes longer than the portion of the EM signal 406 that passes through the thinnest portion 664. The same is true if the EM signal 406 passes through the lens 600 from the OAM shaped surface 602 to the planar surface 652. The lens 600 can thus impart a non-zero OAM to the EM signal 406 with a non-zero OAM mode the absolute value of which corresponds to the distance between the first point 606 and the second point 608 and the sign of which corresponds to whether the first point 606 is above (as shown in FIGS. 6A-6C) or below (not shown in FIGS. 6A-6C) the second point 608.

Figure 7:
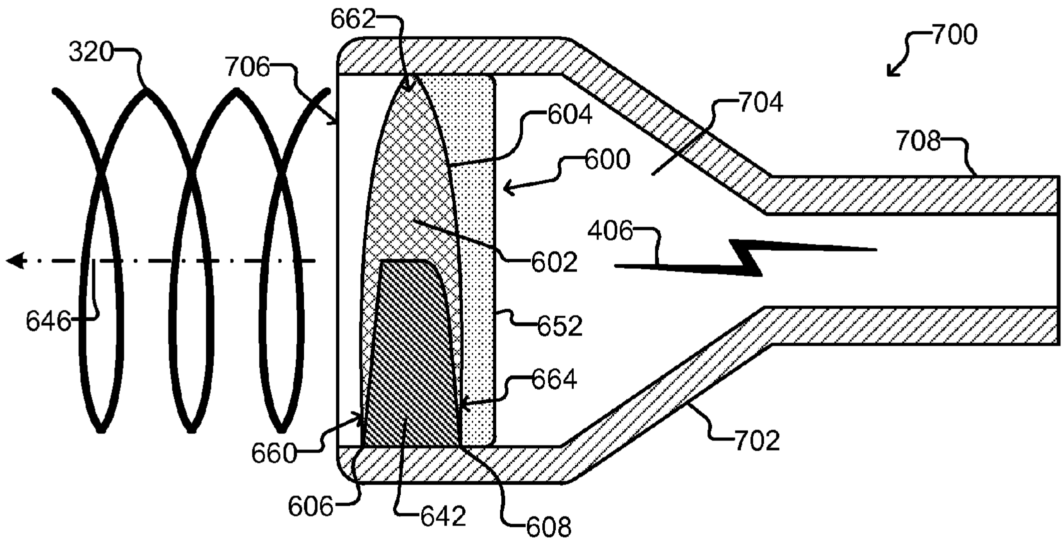
FIG. 7 shows an example of an OAM horn that can be a feed in the antenna system of FIG. 3 according to some embodiments of the invention.

FIG. 7 illustrates an example configuration of a feed 310 of FIG. 3 in the form of an OAM feed horn 700 that includes the lens 600 of FIGS. 6A-6C. As shown, the OAM feed horn 700 can comprise a horn antenna 702, which can comprise an input 708 to an inner cavity 704 with an output opening 706. As shown, the lens 600 can be located adjacent to the output opening 706. For example, as shown, the lens 600 can be inside the inner cavity 704 adjacent to the opening 706. Alternatively, the lens 600 can be outside of the inner cavity 704 adjacent to the opening 706.

The EM signal 406 (see FIG. 4) can be provided from the input 708 into the cavity 704, where the EM signal 406 can pass through the lens 600 before exiting the output opening 706. As discussed above, the lens 600 can impart non-zero OAM to the EM signal 406 as the EM signal 406 passes through the lens 600. Even though the EM signal 406 has zero OAM, the beam that exits from the output opening 706 of the horn antenna 702 can be an OAM feed beam 320 with non-zero OAM, and the OAM feed beam 320 can thus twist about the axis 646 of the lens 600. The axis 646 is thus equivalent to the axis 322 in FIG. 3.

The configuration of the OAM feed horn 700 shown in FIG. 7 is but an example, and variations are contemplated. For example, although the lens 600 is shown oriented such that the OAM shaped surface 602 faces the output opening 706 and the planar surface 652 faces the input 708, the lens 600 can alternatively be oriented such that the planar surface 652 faces the output opening 706 and the OAM shaped surface 602 faces the input 708. As another example, the lens 600 can be located outside of the cavity 704 and thus adjacent to but to the left of the opening 706 in FIG. 7.

Each of the feeds 310 in FIG. 3 can be configured as an OAM feed horn 700. The lens 600 in each feed 310, however, can be configured to impart a different OAM mode to the corresponding EM signal 406.

Figure 8A:
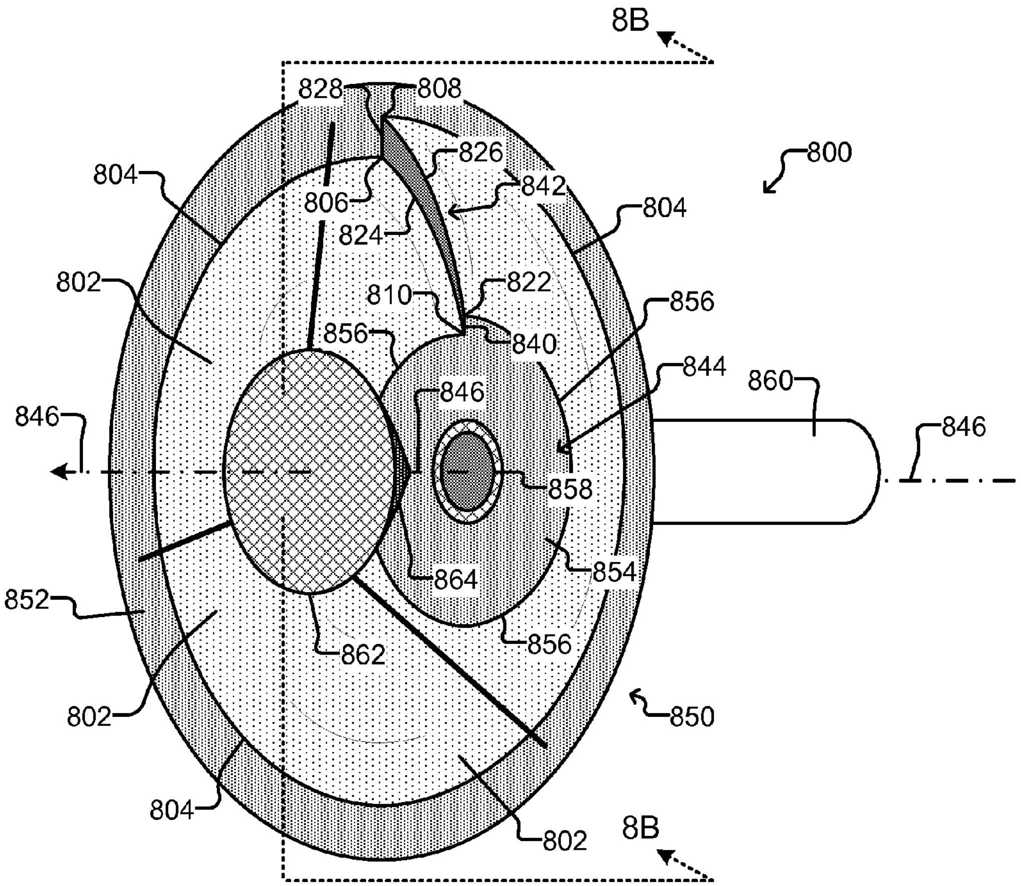
FIG. 8A is a perspective view of another example of an OAM feed that can be used in the antenna system of FIG. 3 according to some embodiments of the invention.
Figure 8B:
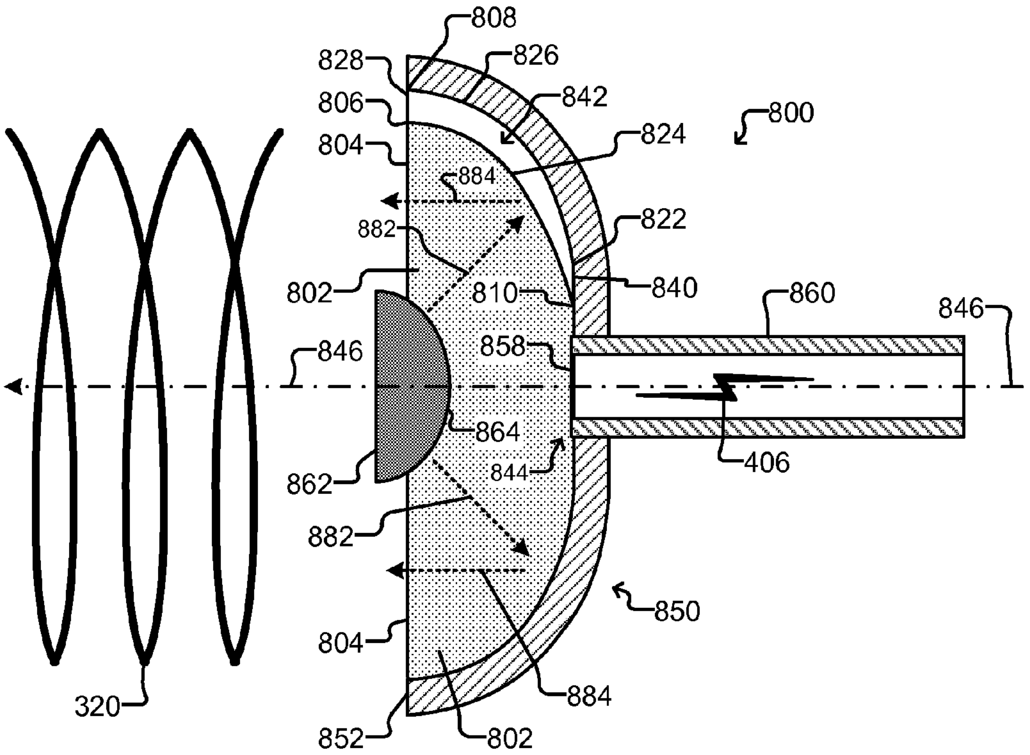
FIG. 8B is a side, cross-sectional view of the OAM feed of FIG. 8A.
Figure 9A:
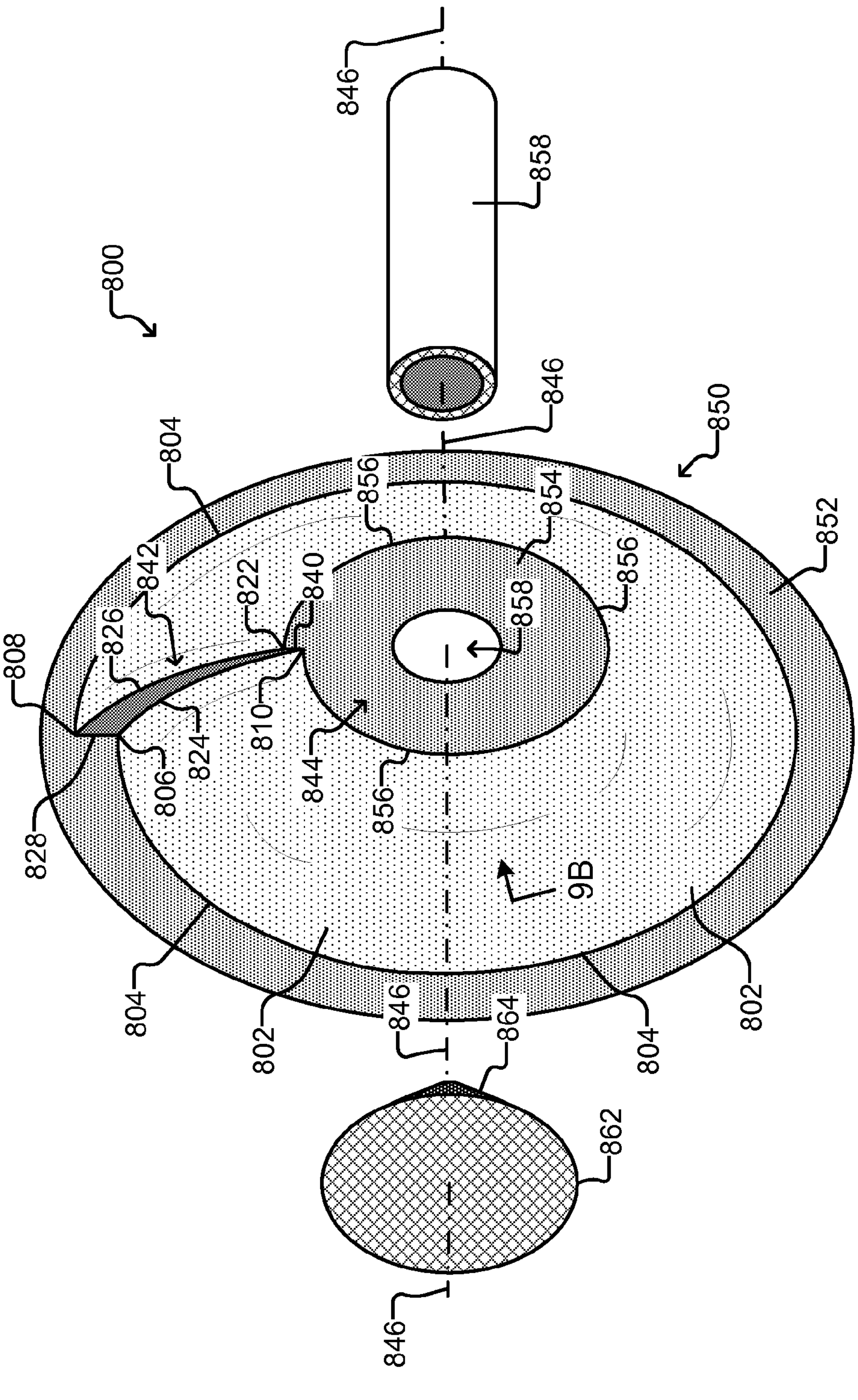
FIG. 9A is an exploded view of the OAM feed of FIG. 8A.
Figure 9B:
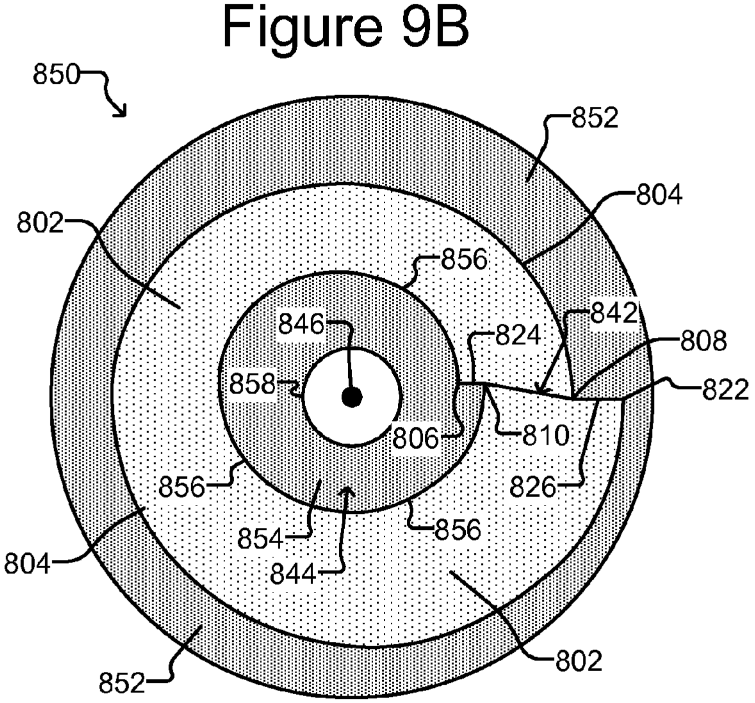
FIG. 9B is a front view of the OAM reflector of the OAM feed of FIG. 8A.

FIGS. 8A-9B illustrate another example of the OAM device 404 of FIG. 4 in the form of an OAM feed 800. FIG. 8A shows a perspective view of the OAM feed 800, and FIG. 8B is a side-cross-sectional view. FIG. 9A illustrates an exploded perspective view of the OAM feed 800, and FIG. 9B is a front view of the OAM reflector 850.

As shown, the OAM feed 800 can comprise an OAM reflector 850, a reflector element 862, and an input line 860 (which can correspond to the feed line 402 in FIG. 4), each of which can be substantially aligned along an axis 846. The OAM reflector 850 can comprise an inner section 854 surrounded by an OAM shaped surface 802, which can be bordered by a rim 852. The reflector element 862 can comprise a reflective surface 864, and the reflector element 862 can be coupled to the OAM reflector 850 and positioned such that the reflective surface 864 faces both an opening 858 in the inner section 854 and the OAM surface 802 of the OAM reflector 850. The reflective surface 864 can comprise a material that reflects EM radiation. The input line 860 can be connected to the opening 858 in the inner section 854 of the OAM reflector 850.

The OAM reflector 850 can be, for example, a dish type antenna, and the OAM shaped surface 802 can comprise material that reflects incident EM radiation. As shown, the OAM shaped surface 802 can extend from a first edge 824 around the axis 846 to a second edge 826, and there can be a discontinuity 842 (e.g., a step) between the first edge 824 and the second edge 826. The OAM shaped surface 802 can be bound by an outer perimeter 804 and an inner perimeter 856 such that the OAM shaped surface 802 also extends from the outer perimeter 804 to the inner perimeter 856. From a first point 806 to a second point 808, the outer perimeter 804 can twist around the axis 846. As illustrated in FIGS. 8A-9B, the distance between the outer perimeter 804 and the axis 846 can continuously increase along the outer perimeter 804 from the first point 806 to the second point 808. Alternatively, although not shown in FIGS. 8A-9B, the distance between the outer perimeter 804 and the axis 846 can continuously decrease along the outer perimeter 804 from the first point 806 to the second point 808. The inner perimeter 856 can generally have similar characteristics. For example, from a third point 810 to a fourth point 822, the inner perimeter 804 can twist around the axis 846. Also, the distance between the inner perimeter 856 and the axis 846 can continuously increase (as shown in FIGS. 8A-9B) or, alternatively continuously decrease (not shown in FIGS. 8A-9B) along the inner perimeter 856 from the third point 810 to the fourth point 822.

The outer perimeter 804 can be substantially a spiral from the first point 806 around the axis 846 to the second point 808. The inner perimeter 856 can similarly be substantially a spiral from the third point 810 around the axis 846 to the fourth point 822. The surface 802 can thus also be substantially a spiral from the first edge 824 around the axis 846 to the second edge 826. Regardless, the outer perimeter 804 from the first point 806 to the second point 808, the inner perimeter 856 from the third point 810 to the fourth point 822, and/or the surface 802 from the first edge 824 to the second edge 826 can make substantially one revolution around the axis 846.

As shown in FIGS. 8A-9B, the discontinuity 842 can be bounded by the first edge 824, the second edge 826, an outer edge 828, and an inner edge 840. The outer edge 828 can be from the first point 806 to the second point 808, and the inner edge 840 can be from the third point 810 to the fourth point 822. The first point 806 and the second point 808 can be separated by a non-zero distance. The distance between the first point 806 and the second point 808 can correspond to the absolute value of the OAM mode of the OAM reflector 850 and thus the OAM feed 800, and whether the first point 806 or the second point 808 is closest to the axis 846 can define the sign of the OAM mode. The first point 806 and the second point 808 can be on a line that is substantially parallel to a line on which the third point 810 and fourth point 822 are located, which can be substantially perpendicular to the axis 846. The first point 806 and the second point 808 can be on the rim 852, and the third point 810 and the fourth point 822 can be on the inner section 854 of the OAM reflector 850.

In some embodiments, the OAM shaped surface 802 can be curved or comprise a curve from points (e.g., every point or some of the points) on the outer perimeter 804 to corresponding points on the inner perimeter 856, and any such curvature of the surface 802 can be concave and/or substantially parabolic. The first edge 824 and/or the second edge 826 can thus be curved concavely and/or can comprise a substantially parabolic curve.

The characteristics of the OAM shaped surface 802 discussed above are examples. The surface 802 can have one or more of the foregoing characteristics as well as other characteristics. The surface 802 need not have all of the characteristics discussed above.

As best seen in FIG. 8B, in operation, an EM signal 406 (see FIG. 4) can be provided from the input line 860 through the opening 858 in the OAM reflector 850 to the reflective element 862. The EM signal 406, which as noted can have zero OAM, can first reflect off of the reflective surface 864 of the reflective element 862 (as depicted by arrows 882 in FIG. 8B) to the OAM shaped surface 802 and then reflect off of the OAM shaped surface 802 (as depicted by arrows 884).

As best seen in FIGS. 8A and 9A, the distance between the reflective surface 864 of the reflector element 862 and the OAM shaped surface 802 is shortest immediately to the left of the first edge 824 (in FIGS. 8A and 9A), and the distance between the reflective surface 864 and the OAM shaped surface 802 is longest immediately to the right of the first edge 824. Moreover, the distance between the reflective surface 864 and the OAM shaped surface 802 continuously increases along the surface 802 going around the axis 846 from the first edge 824 to the second edge 826. The portion of the EM signal 406 that reflects (as depicted by arrow 882 in FIG. 8B) from the reflector 862 to the portion of the OAM shaped surface 802 immediately to the left of the first edge 824 (in FIG. 8A) is the first to reflect (as depicted by arrow 884 in FIG. 8B) from the OAM shaped surface 802 and exit the OAM feed 800. Successive portions of the EM signal 406 sequentially exit the OAM feed 800 from portions of the OAM shaped surface 802 from the first edge 824 around the surface 802 (counter clockwise in the example illustrated in FIGS. 8A-9B) towards the second edge 826. The portion of the EM signal 406 that reflects (as depicted by arrow 882 in FIG. 8B) from the reflector 862 to the portion of the OAM shaped surface 802 immediately to the right of the first edge 824 (in FIG. 8A) is the last to reflect (as depicted by arrow 884 in FIG. 8B) from the OAM shaped surface 802 and exit the OAM feed 800. The OAM shaped surface 802 thus imparts a non-zero OAM to the EM signal 406 with a non-zero OAM mode the absolute value of which corresponds to the distance between the first point 806 and the second point 808 and the sign of which corresponds to whether the first point 806 or the second point 808 is closest to the axis 846. The result is as shown in FIG. 8B: the OAM shaped surface 802 imparts non-zero OAM to the EM signal 806, which is reflected off of the OAM shaped surface 802 and out of the OAM feed 800 as an OAM feed beam 320 with non-zero OAM. As shown, the feed beam 320 can twist around the axis 846, which can thus be equivalent to the axis 322 in FIG. 3.

The OAM feed 800 shown in FIGS. 8A-9B is an example, and variations are contemplated. For example, although the reflective surface 864 is illustrated and discussed above as mode zero (i.e., imparting no OAM to the incident EM signal 406) and the OAM surface 802 is depicted as having a non-zero mode, the reflective surface 864 can be an OAM shaped surface (e.g., generally similar to the OAM surface 802 as illustrated in FIGS. 8A-9B and discussed above) and the surface 802 can be mode zero. As yet another example, both the reflective surface 864 and the surface 802 can be a non-zero mode.

Each of the feeds 310 in FIG. 3 can be configured as an OAM feed 800. The OAM shaped surface 802 in each feed 310, however, can be configured to impart a different OAM mode to its corresponding EM signal 406.

The antenna system 300 of FIG. 3 and the examples of the feeds and components of the feeds shown in FIGS. 4-9B are examples, and variations are contemplated. For example, although the feed beams 320 are illustrated as full OAM beams in FIG. 3, the feed beams 320 can alternatively be partial OAM beams. For example, the feed beams 320 can alternatively be partial OAM beams that twist around the axis 322, for example, like the partial OAM beams illustrated in U.S. patent application Ser. No. 14/077,433, entitled "Antenna For Transmitting Partial Orbital Angular Momentum Beams", which is owned by the same assignee and filed on the same day as the present application. Hereinafter, the foregoing application, which is incorporated herein in its entirety by reference, is referred to as the "Partial OAM Beam Application." If the feed beams 320 are partial OAM beams, the OAM device 404 (see FIG. 4 of the present application) can comprise only a portion, rather than an entirety, of an OAM shaped surface like the surface 502 shown in FIG. 5 generally in accordance with the example illustrated in FIGS. 3A-6 of the aforementioned Partial OAM Beam Application. For example, the lens 600 of FIGS. 6A-6C of the present application can comprise a portion but not an entirety of the lens 600 and thus comprise a portion but not an entirety of the OAM shaped surface 602. As another example, the OAM reflector 850 can comprise only a portion but not an entirety of the OAM shaped surface 802 to generate an OAM feed beam 320 as a partial OAM bean rather than a full OAM bean in accordance with the teachings of the above-identified Partial OAM Beam Application. Each of the feeders 310, including any example of a feeder 310 illustrated or discussed herein, can comprise a polarizing component for polarizing the EM signal 406. Alternatively, any of the feeders 310, including any example of a feeder 310 illustrated or discussed herein, can simply receive the EM signal 406 as a polarized EM signal. Thus, any beam identified as an OAM beam in the disclosure or claims of the present application can be a partial OAM and/or can be polarized.

Figure 10:
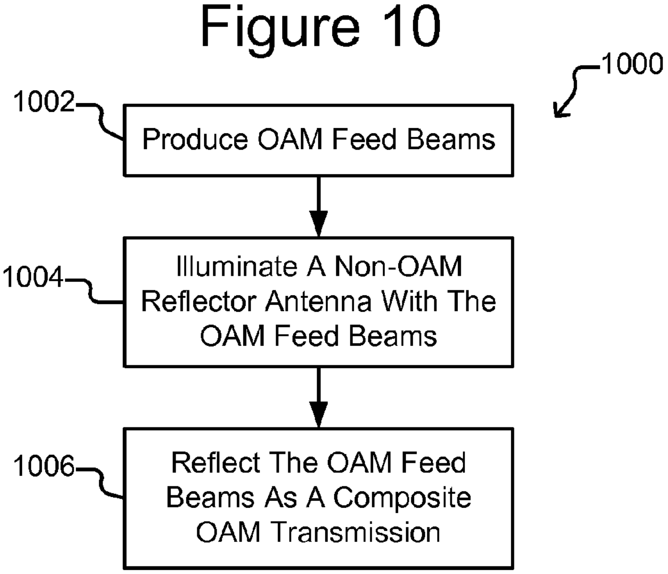
FIG. 10 is an example of a process for transmitting one or more OAM beams with a non-OAM primary reflective antenna according to some embodiments of the invention.

FIG. 10 illustrates an example of a process 1000 for transmitting one or more OAM beams with a non-OAM reflector antenna. For ease of illustration and discussion, the process 1000 is discussed below with respect to the antenna system 300 of FIG. 3, but the process 1000 is not limited to operation on the antenna system 300.

As shown, at step 1002, the process 1000 can produce one or more OAM feed beams. For example, the process 1000 can produce the OAM feed beams 320 in any manner discussed above. At step 1004, the process 1000 can illuminate a non-OAM reflective antenna with the OAM feed beam or beams produced at step 1002. For example, the process 1000 can illuminate the primary reflective antenna 302 with the OAM feed beams 320 in any manner discussed above. At step 1006, the process 1000 can reflect the one or more OAM feed beams. If more than one OAM feed beam is produced at step 1002 and illuminates the non-OAM reflective antenna at step 1004, the process 1000 can reflect the multiple OAM feed breams at step 1006 as a composite OAM transmission that comprises each of the OAM feed beams. For example, the primary reflective antenna 302 can reflect the plurality of OAM feed beams 320 as a composite OAM transmission 330 in which each of the individual reflected OAM beams 332 correspond to one of the OAM feed beams 320 as shown in FIG. 3 and discussed above.

Although specific embodiments and applications of the invention have been described in this specification, these embodiments and applications are exemplary only, and many variations are possible.

We claim:

1. An orbital angular momentum (OAM) antenna system comprising:

an OAM mode zero reflective antenna; and a first feed comprising a first OAM shaped surface configured to impart a mode m OAM to a first EM signal and thereby produce a first OAM feed beam having said mode m OAM, said first feed positioned to illuminate said reflective antenna with said first OAM feed beam, wherein m is not zero.

2. The antenna system of claim 1 further comprising a second feed comprising a second OAM shaped surface configured to impart a mode n OAM to a second EM signal and thereby produce a second OAM feed beam having said mode n OAM, said second feed positioned to illuminate said reflective antenna with said second OAM feed beam, wherein:

n is not zero; and n is not equal to m.

3. The antenna system of claim 2, wherein said reflective antenna reflects said first OAM feed beam and said second OAM feed beam as a composite OAM transmission comprising said first OAM feed beam and said second OAM feed beam.

4. The antenna system of claim 1, wherein said first OAM shaped surface interacts with said first EM signal to impart said mode m OAM to said first EM signal.

5. The antenna system of claim 4, wherein:

said first OAM shaped surface comprises an outer perimeter that twists from a start point to an end point around an axis between said first feed and said reflective antenna; and said start point is spaced a non-zero distance D from said end point.

6. The antenna system of claim 5, wherein said start point and said end point are on a line that is substantially parallel to said axis.

7. The antenna system of claim 5, wherein said start point and said end point are on a line that is substantially perpendicular to said axis.

8. The antenna system of claim 5, wherein said outer perimeter is substantially a spiral.

9. The antenna system of claim 5, wherein said outer perimeter is substantially a helix.

10. The antenna system of claim 1, wherein:

said first feed comprises an OAM lens, said OAM lens comprises said first OAM shaped surface, and said OAM lens imparts said mode m OAM to said first EM signal as said first EM signal passes through said lens from a first side to an opposite second side of said lens.

11. The antenna system of claim 10, wherein:

one of said first side or said second side of said lens comprises said first OAM shaped surface, which has an outer perimeter that twists around and moves substantially parallel to an axis; and another of said first side or said second side of said lens comprises a substantially planar surface.

12. The antenna system of claim 1, wherein:

said first OAM shaped surface is reflective and comprises an outer perimeter that twists around and moves toward or away from an axis, said first EM signal is a zero OAM signal, said first OAM shaped surface is positioned to receive said first EM signal as an incident signal and reflect said first EM signal to said reflective antenna as said first OAM feed beam.

13. The antenna system of claim 12, wherein said first feed further comprises a zero OAM mode reflector element for reflecting said first EM signal onto said first OAM shaped surface of said first feed.

14. An orbital angular momentum (OAM) antenna system comprising:

an OAM mode zero reflective antenna; and first feed means for feeding a first OAM feed beam to said reflective antenna, said first OAM feed beam having a mode m OAM, wherein m is not zero.

15. The antenna system of claim 14 further comprising second feed means for feeding a second OAM feed beam to said reflective antenna, said second OAM feed beam having a mode n OAM, wherein:

n is not zero; and n is not equal to m.

16. The antenna system of claim 15, wherein:

said first feed means comprises first OAM means for imparting said mode m OAM to a first zero OAM electromagnet (EM) signal and thereby producing said first OAM feed beam from said first zero OAM EM signal, and said second feed means comprises a second OAM means for imparting said mode n OAM to a second zero OAM EM signal and thereby producing said second OAM feed beam from said second zero OAM EM signal.

17. A process of transmitting an orbital angular momentum (OAM) beam, said process comprising:

illuminating an OAM mode zero reflective antenna with a first OAM feed beam having a mode m OAM, wherein m is not zero; and reflecting from said reflective antenna said first OAM feed beam.

18. The process of claim 17 further comprising illuminating said reflective antenna with a second OAM feed beam having a mode n OAM, wherein:

n is not zero; and n is not equal to m.

19. The process of claim 18, wherein said reflecting further comprises reflecting from said reflective antenna said first OAM feed beam and said second OAM feed beam as a composite OAM transmission.

20. The process of claim 19 further comprising:

producing said first OAM feed beam by imparting said mode m OAM to a first EM signal that has zero OAM; and producing said second OAM feed beam by imparting said mode n OAM to a second EM signal that has zero OAM.

21. The process of claim 20, wherein:

said producing said first OAM feed beam comprises passing said first EM signal through a first OAM lens; and said producing said second OAM feed beam comprises passing said second EM signal through a second OAM lens.

22. The process of claim 21, wherein:

said passing said first EM signal through said first OAM lens comprises passing said first EM signal through a surface of said first OAM lens that has an outer perimeter that twists around and moves parallel to a first axis; and said passing said second EM signal through said second OAM lens comprises passing said second EM signal through a surface of said second OAM lens that has an outer perimeter that twists around and moves parallel to a second axis.

23. The process of claim 20, wherein:

said producing said first OAM feed beam comprises reflecting said first EM signal off of a first surface to said reflective antenna, wherein said first surface has an outer perimeter that twists around and moves toward or away from a first axis, and said reflecting said first EM signal imparts said mode m OAM to said first EM signal; and said producing said second OAM feed beam comprises reflecting said second EM signal off of a second surface to said reflective antenna, wherein said second surface has an outer perimeter that twists around and moves toward or away from a second axis, and said reflecting said second EM signal imparts said mode n OAM to said second EM signal.

24. The antenna system of claim 1, wherein said first OAM shaped surface comprises:

an outer perimeter, a first edge extending from a first point on said outer perimeter to a central region of said first OAM shaped surface, a second edge extend from a second point on said outer perimeter to said central region, and a step between said first edge and said second edge.

25. The antenna system of claim 1, wherein:

an outer perimeter of said first OAM shaped surface is a spiral from a first point on said outer perimeter to a second point on said outer perimeter, and said first OAM shaped surface comprises a step from said first point to said second point.

* * * * *